United States Patent
Munoz-Garcia et al.

(10) Patent No.: US 6,340,948 B1
(45) Date of Patent: *Jan. 22, 2002

(54) ANTENNA SYSTEM

(75) Inventors: Samuel Munoz-Garcia, London (GB); Shinichi Nomoto, Tokyo (JP); Peter Poskett, Little Marlow; Dennis Mullins, London, both of (GB); Ben Hutchinson, Rockville, MD (US); Patrick Chomet, London (GB)

(73) Assignee: International Mobile Satellite Organization (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,071
(22) PCT Filed: Mar. 30, 1995
(86) PCT No.: PCT/GB95/00745
 § 371 Date: Jun. 17, 1997
 § 102(e) Date: Jun. 17, 1997
(87) PCT Pub. No.: WO95/28747
 PCT Pub. Date: Oct. 26, 1995

(30) Foreign Application Priority Data

Apr. 18, 1994 (GB) ................................. 9407669

(51) Int. Cl.[7] .......................... H01Q 3/22; H01Q 3/24; H01Q 3/26
(52) U.S. Cl. ..................... 342/373; 342/354; 455/13.3
(58) Field of Search ................. 342/354, 373; 455/13.3

(56) References Cited

U.S. PATENT DOCUMENTS

| 3,979,754 A | 9/1976 | Archer |
| 4,424,500 A | 1/1984 | Viola et al. |
| 4,503,436 A | 3/1985 | Cramer, Jr. |

(List continued on next page.)

FOREIGN PATENT DOCUMENTS

| AU | B-17137/92 | 5/1992 |
| CA | 1 226 934 | 9/1987 |
| EP | 0 253 465 | 1/1988 |
| EP | 0 311 919 | 4/1989 |
| EP | 0 398 555 | 11/1990 |
| EP | 0 405 372 A1 | 1/1991 |
| EP | 0 516 039 A1 | 12/1992 |
| EP | 0 624 008 A2 | 11/1994 |
| GB | 1 508 726 | 9/1976 |
| GB | 2 044 008 A | 2/1980 |
| GB | 2 140 974 A | 6/1983 |
| GB | 2 184 921 A | 11/1986 |
| GB | 2 251 729 A | 10/1989 |
| GB | 2 248 521 A | 10/1990 |

Primary Examiner—Theodore M. Blum
(74) Attorney, Agent, or Firm—Banner & Witcoff, Ltd.

(57) ABSTRACT

A communication station for generating or receiving an angularly dispersed array of radiation beams, comprising an array of radiating elements (100) defining an array antenna (1); and a beam former (120), the beam former comprising a passive network having a first side (X) carrying a plurality of beam ports for electrical signals corresponding to the beams and a second side (Y) carrying a plurality of antenna ports corresponding to the radiating elements, each beam port being connected to a plurality of antenna ports via a network (50) of power divider (52) and phase shifter (53) components, the phase shifts of which are in integer multiples of a predetermined constant, so as to generate the array of beams; in which the array antenna (1) has triangular or hexagonal symmetry and the array of beams has triangular or hexagonal symmetry.

23 Claims, 9 Drawing Sheets

U.S. PATENT DOCUMENTS

| | | | |
|---|---|---|---|
| 4,618,831 A | | 10/1986 | Egami et al. |
| 4,868,886 A | | 9/1989 | Assal et al. |
| 4,879,711 A | | 11/1989 | Rosen |
| 4,882,588 A | * | 11/1989 | Renshaw et al. ........... 342/373 |
| 4,901,085 A | * | 2/1990 | Spring et al. ............... 342/373 |
| 5,038,147 A | | 8/1991 | Cerro et al. |
| 5,038,150 A | * | 8/1991 | Bains ......................... 342/373 |
| 5,093,668 A | * | 3/1992 | Sreenivas .................... 342/373 |
| 5,115,248 A | | 5/1992 | Roederer |
| 5,162,804 A | | 11/1992 | Uyeda |
| 5,422,647 A | | 6/1995 | Hirshfield et al. |
| 5,623,269 A | * | 4/1997 | Hirshfield et al. .......... 342/354 |
| 5,648,784 A | * | 7/1997 | Benedicto Ruiz et al. .. 342/373 |

* cited by examiner

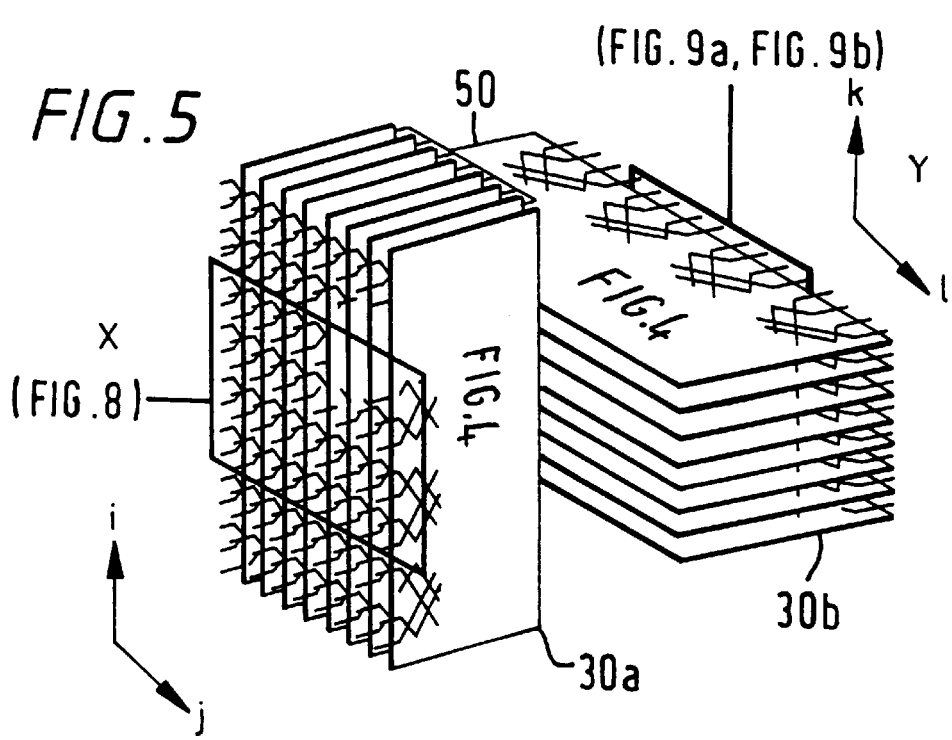
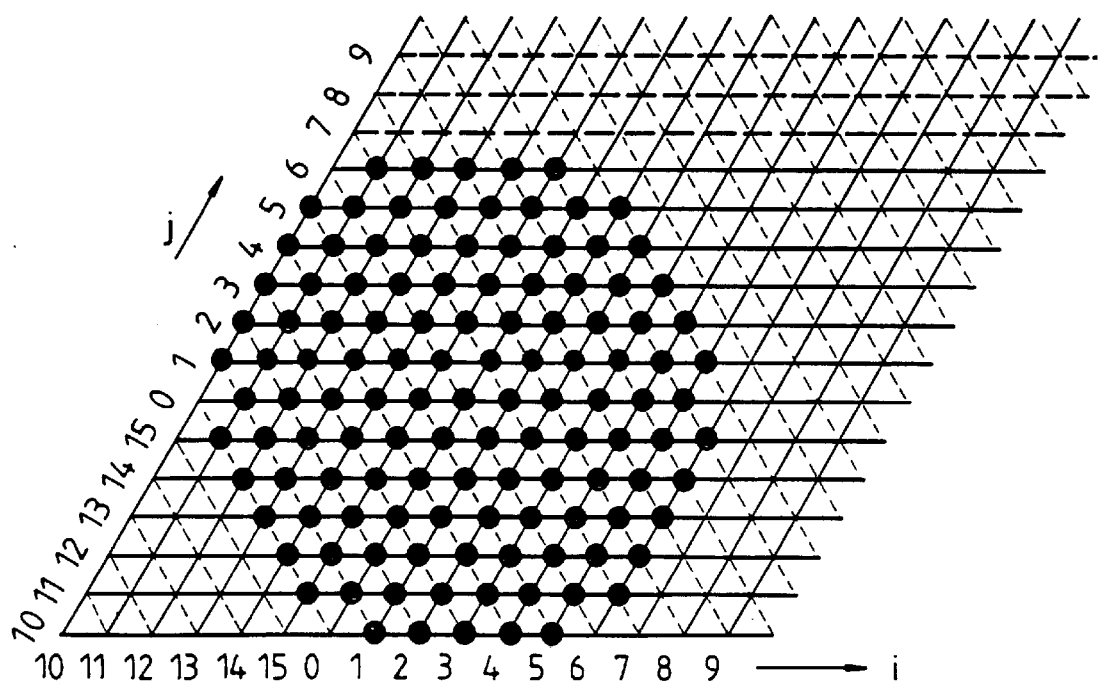

ANTENNA SYSTEM

This invention relates to an antenna system; particularly, but not exclusively, to a multiple beamformer for a satellite mobile communication system.

Such systems are described (in general terms) in, for example, WO93/09029; WO93/09577; WO93/09578; WO93/09613; WO93/09614; WO93/09624; EP-A-0510789; EP-A-035885; EP-A-421722. The proposed Inmarsat (TM) P21 system consists of a number of earth stations, which may be mobile stations, having antennas for communication with a constellation of communications satellites. Each satellite carries an antenna system designed to transmit and receive an array of multiple beams, each directed towards a portion of the surface of the Earth, the beams together covering the entire surface of the Earth.

Each beam carries a number of frequency-multiplexed channels; for example, the bandwidth of each beam may be 5 MHz, enabling each to carry a large number of user channels (typically carrying voice telecommunications). The satellite typically also carries an antenna for connection to a fixed earth station, communicating for example with a public telecommunications network.

To synthesize a plurality of beams in the far field beam pattern, if the transmit and receive antennas are directly radiating antennas (i.e. without reflectors) consisting of a large array of radiating elements, a conventional beam forming network requires, in principle, a phase shifter for every radiating element, for each beam position, and a power divider for every beam. Thus, for one hundred elements and on hundred beams, 10,000 phase shifters and 100 power dividers are needed, and the number of components grows roughly exponentially for large numbers of beams and elements.

This represents a considerable weight of RF components, and the power losses of the feeding system is also high. Both weight and electrical power consumption are at a premium in satellites.

One alternative type of beam former for array antennas is the "Butler matrix", described in U.S. Pat. No. 3,255,450 (Butler), which consists of a butterfly cascade arrangement of four-port power dividers with associated phase shifters, receiving N input RF signals and feeding a linear array of N spaced elements. The dividers each receive two input analogue RF signals, one of which is phase shifted, and output two RF signals with a 90 degree phase difference. The effect of the array of dividers and phase shifters is that the RF signal supplied to any one of the inputs is fed, in progressively incrementing phase shifts, to each of the elements of the array. Thus, the array acts as a phased array, generating a beam at an angle dependent upon the phase shift increment (which depends upon the number of radiating elements) and the element spacing.

By selectively exciting each input in turn, an incrementally scanning beam can be generated which may be used in radar applications. Alternatively, the beamformer can be used to generate a grid of multiple fixed beams from a common aperture. A beam can be scanned in one of two orthogonal directions by providing several such linear matrices in aligned rows and columns, the outputs of the row matrices feeding the inputs of the column matrices, and the outputs of the column matrices feeding a two dimensional array of radiators.

Butler matrices are virtually lossless, and this tends to be the reason for their use.

JP-A-59-44105 discloses a two-dimensional beam-forming network comprising two orthogonal stacks of Butler matrices, for forming beams lying aligned along angles on a rectangular array. EP-A-0056205 discloses a large Butler matrix formed from two orthogonal stacks of Butler matrices.

WO88/04837 discloses a steerable beam reflector antenna used on a communications satellite in which a Butler matrix is used for beam steering.

EP-A-0468662 discloses an antenna (which may be a directly radiating antenna) in which a Butler matrix is used as a power splitter to distribute power between antenna array elements to form a single unidirectional composite beam, the progressive phase shifts provided by the matrix being cancelled by phase shifter elements.

A feature of linear Butler matrix array antennas is that the crossover point between adjacent beams is over 3dB down, so that the power between the beams drops off to half the maximum beam level. For a square array, the power minima between 4 adjacent beams are 8dB down, which would, of itself, render a conventional square Butler matrix unsuitable for forming multiple satellite communication beams, since it is desirable to provide uniform coverage of the Earth surface.

According to the present invention, there is provided an antenna system using a passive power splitter matrix (e.g. a Butler matrix) as a beam former for a hexagonal array antenna to create a hexagonal array of beam directions.

The use of a hexagonal array gives a better coverage of the Earth surface than would an equivalent square array, since the power between adjacent beams does not drop off so deeply.

Preferably, the aperture around the array is smoothed, which, in the far field pattern, reduces the drop off in power between adjacent beams.

Preferably, the matrix is made redundant, and only some output ports are connected to radiating elements; the other output ports are terminated.

This aspect of the invention causes the Butler matrix to no longer achieve its usual advantage of being lossless. However, we have found that the loss is tolerable, for an improvement in power drop off at the crossover.

In a preferred embodiment, the amplification or loss in the path to the radiating elements differs across the aperture of the array, so as to provide a gentle taper in the power fed to the edges of the array. This aspect of the invention raises the cross-over level between beams and reduces the sidelobe level of the far-field radiation pattern.

Preferably, the matrix comprises two orthogonally connected stacks of power splitter matrices.

In another aspect, the invention provides a beam forming network for an array antenna system which comprises first and second orthogonally connected stacks of power splitter matrices, there being fewer matrices in at least one stack than the order of the matrices in that stack. Thus, "oversized" matrices may be employed to form non-rectangular antenna arrays, but without requiring matrices to the number of twice the order of each matrix.

In another aspect, the invention provides an antenna system in which several different power splitter matrices are provided, and corresponding output ports of each matrix are connected jointly to elements of an array antenna, so that a single array antenna can generate multiple grids of beams. By phasing the outputs of the matrices differently, the different grids can be steered to offset positions, so that one grid can be interpolated at minima between beams of another.

In another aspect, the invention provides a communication transceiver station (for example, a satellite) having a digital processor for performing channelization (i.e. multiplexing and demultiplexing) connected via an analogue beam former comprising a passive power splitting network (e.g. a Butler matrix). This enables the load on the processing device to be greatly reduced, without the substitution of a highly complex beam forming structure, and thus reduces the mass, power consumption and volume of the signal processing system, and hence makes it more suitable for use in a satellite.

In another aspect, the invention provides an antenna system in which several different Butler matrix devices are connected in parallel to the same array antenna, each device being arranged to generate an array of beam directions, the arrays being mutually offset so as to produce a combined array of beam directions having a smaller angular spacing.

Thus, a single antenna can be used to generate a large number of beams, with improved beam coverage and reduced dropoff between beams as compared to a beam array producible from a single Butler matrix device.

Other aspects and embodiments of the invention are as described in the following description and claims.

Preferred embodiments of the invention will now be illustrated, by way of example only, with reference to the accompanying drawings, in which:

FIG. 5 is a schematic perspective view showing the arrangement of Butler matrices of FIG. 4 to provide a beam former according to the embodiment of FIG. 3;

FIG. 8 is a diagram illustrating the connection of transmit and receive beam ports to respective beam formers shown in FIG. 5;

Figure 1:
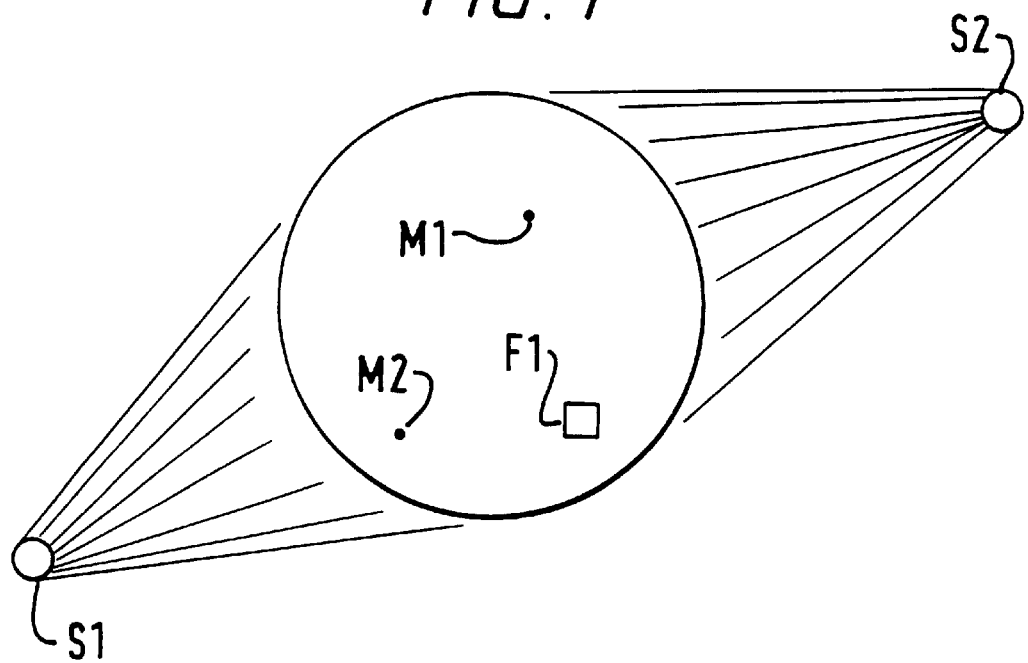
FIG. 1 illustrates schematically a satellite mobile communications system.

FIG. 1 illustrates a known proposed satellite mobile communications system. The system comprises at least one satellite (S1 and S2) in orbit around the Earth (E), on which are located a plurality of terminals; for example mobile communications terminals (M1 and M2) and fixed communications terminals (F1). The latter may, for example, comprise Earth stations connected to telecommunications networks (e.g. the PSTN).

The satellites are preferably in intermediate circular orbits (ICO), at a height, for example, of 10,000 km above the Earth. Twelve satellites may be provided, for example, in angularly distributed sets of four in each of three mutually normal orbits, so that each terminal is within the field of vision of several satellites at any time.

Each satellite generates a plurality of spatially separated (but overlapping) radiation (e.g. radio frequency) beams, forming an array of beams (T1–TN) which covers a contiguous area of the surface of the Earth; typically, the whole surface, in a manner described in more detail below. Each satellite also has an array of radiation reception directions (R1–RN) which intercept the surface of the Earth; typically, the reception directions coincide with the beams. Thus, the beams and reception directions constitute spatially separate communications channels between the satellites and the terminals. As the satellites are non-geostationary, and as the terminals may be mobile, a given terminal may pass through multiple such channels over time, and may also need to cease to communicate with one satellite and switch to another ("handover").

In known fashion, one terminal can communicate with another, or with a telecommunications network, by establishing contact with a satellite, which then establishes contact with another terminal and transponds messages between the two.

Figure 2:
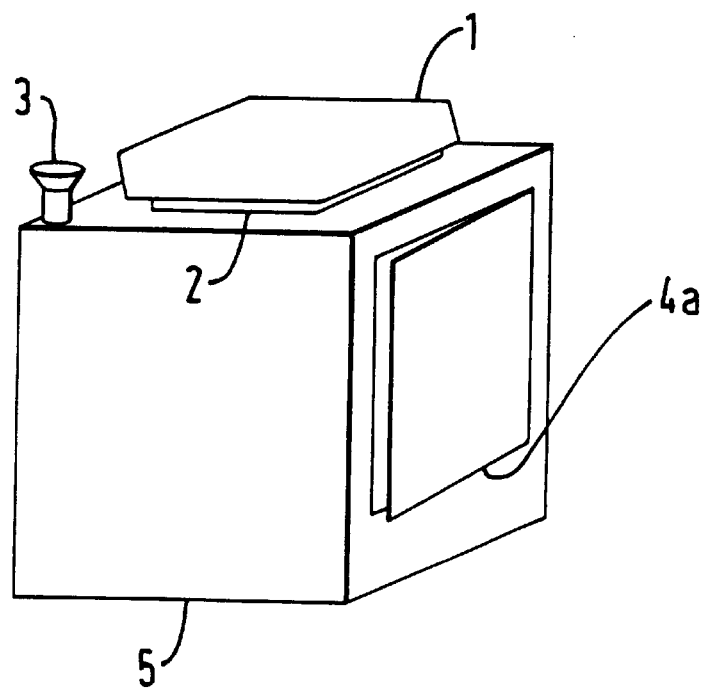
FIG. 2 is a perspective view of a space vehicle according to one embodiment of the invention.

Referring now to FIG. 2, a satellite according to the present embodiment comprises a housing 5, carrying a pair of deployable solar cell panels 4a, 4b (shown folded); at least one steerable high gain spot beam antenna 3 providing a feeder link for communicating with one or more fixed Earth stations connected to telecommunications networks; a receive array antenna 1 receiving on the plurality of reception directions R1–RN; and a transmit array antenna 2 for generating the plurality of beams B1–BN. The antennas 1–3 are provided on the side of the satellite which is maintained facing the Earth.

A brief explanation of the modulation employed will now be given. The feeder link antenna 3 operates in the Ka band, at a transmit frequency of 20 GHz and a receive frequency of 30 GHz, over a bandwidth of 50 MHz. The receive antenna operates at a frequency of 2 GHz and the transmit array antenna at a frequency of 2.2 GHz, each with a bandwidth of 30 MHz. Each beam (in this embodiment there are 121) is allocated a block of 5 MHz within this spectrum, the blocks allocated to neighbouring beams being different so as to reduce the interference between adjacent beams. Each block includes up to 25 frequency slots (FDM and/or TDM) of 200 KHz bandwidth. Each frequency slot is split into 48 user channels. The bandwidth available for each user is thus 4 KHz, which is adequate for speech. Each beam can communicate with 1200 simultaneous users.

Figure 3:
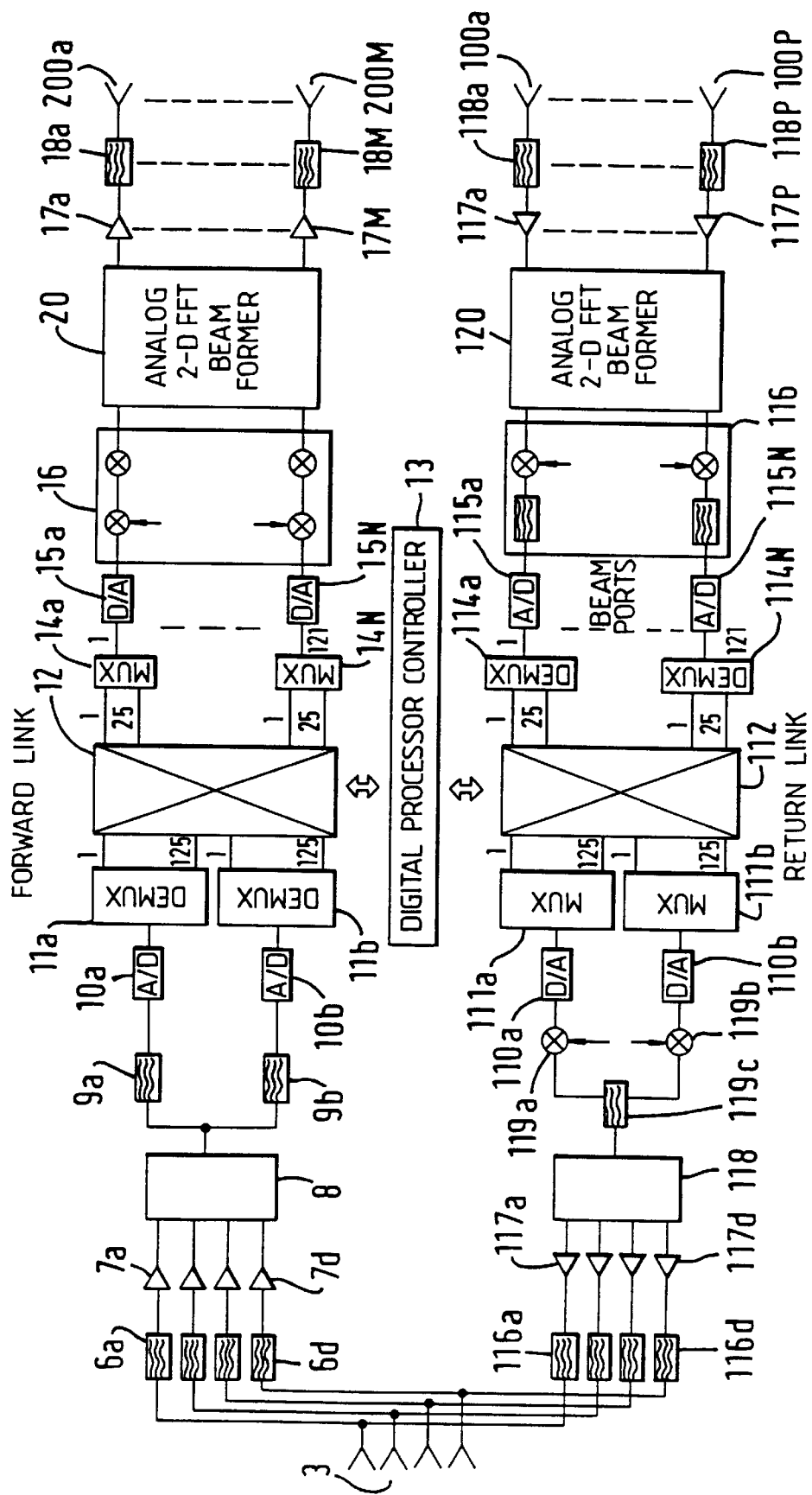
FIG. 3 is a block diagram showing schematically the electrical components of the communications system of the space vehicle of FIG. 1.

Referring to FIG. 3, the electrical arrangement provided within the satellite comprises a forward link, for communicating from an Earth station to a terminal, and a return link, for communicating from the terminal to the Earth station. The forward link comprises the feeder link antenna 3, the signals from which are bandpass filtered by respective filters 6a–6d and amplified by respective low noise amplifiers 7a–7d. The amplified signals are combined and down-converted to an intermediate frequency (IF) by a combiner/IF downconverter circuit 8. This IF signal is separated into two 25 MHz bands by complementary filters 9a, 9b, each of which is digitised by respective analogue to digital convertors (ADCs) 10a, 10b. The digitised IF signals are each then frequency-demultiplexed into 125 slots by frequency demultiplexers 11a, 11b, thus giving a total of 250 slots each of bandwidth 200 KHz.

Under the control of a digital control circuit 13, a switch or routing network 12 routes each of the 250 frequency slots to one of the 25 input ports of one of 121 (or, in general, N where N is the number of beams) frequency multiplexers 14a–14N, which multiplex the slots into a 5 MHz baseband signal which will be transmitted on one of the beams B1–BN. The multiplexer 14 (and hence beam B) selected by the control circuit determines the geographical location on the Earth to which the frequency slot is transmitted, and the multiplexer input port (and hence modulation frequency) determines the user terminal which will receive the frequency slot.

Each of the 121 multiplexed digital baseband signals is then converted to an analogue signal by a respective digital to analogue converter (DAC) 15a–15N, the outputs of which are each up-converted to a beam frequency lying within a 30 MHz range in the 2.2 GHz band by an array 16 of IF/S band converters. As mentioned above, the frequencies chosen for adjacent beams are different. The modulated signals are then supplied to respective input ports of an analogue beam former 20, which generates a plurality M (e.g. 109) of energising signals for energising respective radiating elements 200a–200M of the transmit array antenna 2. The energising signals are amplified by a bank of M RF power amplifiers 17a–17M, and bandpass filtered by a bank of filters 18a–18M, prior to being supplied to the respective radiating elements 200a–200M.

The components of the return link are, in general, the reverse of those in the forward link. A plurality P of receiving elements, (for example 151) 118a–118P receive incoming radio signals in the 2 GHz band from terminals on the Earth. The signal from each element is filtered and amplified by respective filters 118a–118P and low noise amplifiers 117a–117P, and fed to the input ports of an analogue beam former 120. The signals at each of the N output ports of the beam former 120 are down-converted to a 5 MHz baseband signal by an array 116 of S/IF convertors, and digitised by a respective ADC 115a–115N.

The digitised baseband signals are each frequency demultiplexed into 25 frequency slots of 200 KHz bandwidth by demultiplexers 114a–114N, and the frequency slots are routed, under control of the control circuit 13, through a switch 112 to a predetermined input (corresponding to a particular frequency) of one of a pair of frequency multiplexers 111a,111b generating 25 MHz output signals which are converted to analogue signals by a pair of DACs 110a,110b. The analogue signals are then combined into a 50 MHz signal by a pair of modulators 119a,119b and a filter 119c, and the combined signal is up-converted into 20 GHz signals by an IF/Ka converter and RF divider network 118.

Each RF signal is amplified by an RF power amplifier (e.g. a travelling wave device) 117a–117d; filtered by a bandpass filter 116a–116d; and supplied to a feed link antenna 3 for transmission to a respective Earth station.

Thus, the system shown in FIG. 3 will be seen to consist of a feeder link communication subsystem comprising the elements 3, 6–9 and 16–19; a channel separation and combination subsystem comprising the elements 11–14 and 111–114; and a mobile link communication subsystem comprising the elements 16–18, 116–118, and antennas 1 and 2. Since, in this embodiment, the channel separation and combination (i.e. processing) subsystem is digital, ADCs and DACs 10, 15, 110, 115 are provided.

The use of a digital channel processing subsystem, which is desirable, is facilitated in the present invention because, since the beam forming is performed by relatively wide bandwidth analogue beam formers 20, 120, it need not be performed by the digital hardware, which therefore does not need to operate over the full 30 MHz mobile link spectrum and can accordingly be realised using readily available components.

Further, the power consumption of digital signal processing is roughly proportional to the signal bandwidth. Thus, since in the present invention the digital processor operates over 5 MHz bandwidth signals at each beam port, and 30 MHz bandwidth signals for the array elements are handled by the analog beamformer, the power consumption required by the digital processor is drastically reduced relative to an all-digital system.

Figure 4:
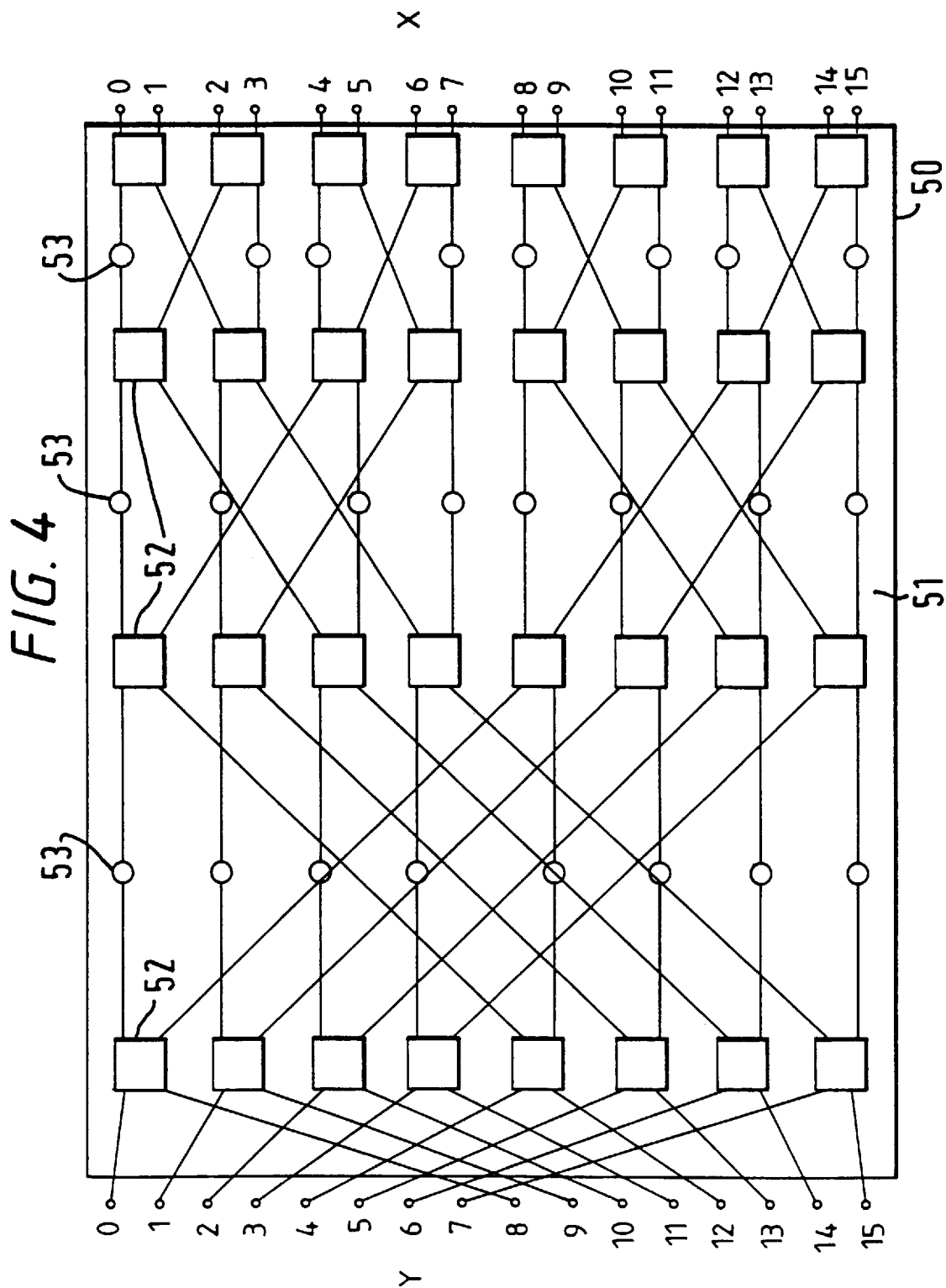
FIG. 4 is a block diagram showing schematically a Butler matrix used in the embodiment of FIG. 3.

Referring to FIGS. 4 and 5, the analogue beam formers 20,120 will now be described in greater detail. Each analogue beam former 20,120 consists of two orthogonally connected stacks 30a,30b of Butler matrices 50, as shown in FIG. 5.

The stacks each consist of identical Butler matrix devices 50, each, as shown in FIG. 4, comprising a 16 input, 16 output (i.e. 16×16) device comprising a substrate 51, a first side X carrying a plurality of first ports, a second side Y carrying a plurality of second ports, a plurality of identical 4 port couplers or hybrids 52, and a plurality of phase shifters 53, all interconnected by striplines.

The term "side" in the document is used in a topological sense, without reference or limitation to the actual geometrical arrangement of the matrix; the physical positions of the ports and components are irrelevant (provided that the phase of the signals is not unduly distorted).

Both beam formers 20, 120 use matrix devices as shown in FIG. 4, but the number of such matrices making up the stacks illustrated in FIG. 5 differs between the beam formers 20, 120.

The structure of Butler matrices is well known in the art; it suffices to say that each hybrid (which may have the structure disclosed in EP-A-0056205, incorporated herein by reference in its entirety) divides the power input at two input ports thereof equally between two output ports thereof, which are separated in phase by 90 degrees. Where there are K first and second ports, and K is a power of 2, the matrix consists of (log2K) rows each of K/2 hybrids, and ((log2K)–1) rows of K/4 phase shifters disposed between the hybrids, each hybrid being connected to two in the following row, the spacing between the two to which a hybrid is connected increasing as a power of two in each successive row. The phase shifts imposed by the phase shifters 53 are in increments of (180/N) degrees, and the phase shifters of the first row apply shifts which are odd multiples of (180/N); those of the next row apply shifts which are odd multiples of (180/2N): those of the next row apply shifts which are odd multiples of (180/4N); and so on. Although in FIG. 4, K/2 ((log 2K)–1) phase shifters 53 are indicated, only half of these apply non-zero phase shifts and the others may therefore be omitted in practice.

The effect of this structure is that the signal at each first port X is divided into N signals of equal amplitude each appearing at one of the second ports Y, and each having a progressive phase displacement. For example, a signal applied at a first of the first ports, with an amplitude A, appears as a first signal at the first of the second ports with an amplitude A/N; a second signal at the second of the second ports of the same amplitude but shifted in phase by (360/N=Δ) a third signal of equal amplitude at the third port, shifted in phase by delta from the second; . . . and a sixteenth signal at the sixteenth of the second ports shifted in phase by delta from the fifteenth, and in phase with the first.

A signal applied at the second of the first ports X will likewise be evenly split between the second ports Y, but the phase shift increment is 2*Δ; the phase shift increment for the third input port is 3*Δ and so on.

It will be apparent that if the second ports are connected to an evenly spaced array of radiating elements, the result is a phased array antenna, the beam offset angle depending on the array spacing, the signal frequency, and the phase increment, which itself depends upon the number of first ports and the identity of the first port at which the signal is provided. If multiple first ports are simultaneously excited, a grid of beams at incrementally shifted alignment angles are created, each one corresponding uniquely to the signal at one of the first ports.

Each matrix device of FIG. 4 is reciprocal, and hence the above description may be reversed; in other words, a plurality of signals applied at the second ports Y in a certain incremental phase relationship will result in the production of a signal at a single one, or multiple ones, of the first ports X so that a combination of the matrix device with an array antenna can provide a receive array antenna.

If a stack of N Butler matrices of the structure of FIG. 4 were positioned in parallel, in the manner shown in FIG. 5, and each aligned row of output ports of all the matrices of the stack were connected to the input ports of a single Butler matrix of a second stack of N Butler matrices (in other words, the two stacks were orthogonally interconnected, where "orthogonal" in this document refers to the connection topology rather than any physical or geometrical arrangements of the devices), the two dimensional array of $N^2$ output ports of the second stack could be connected to respective radiating elements of a square two dimensional array of radiating elements, to provide a two dimensional grid of beams.

Figure 6A:
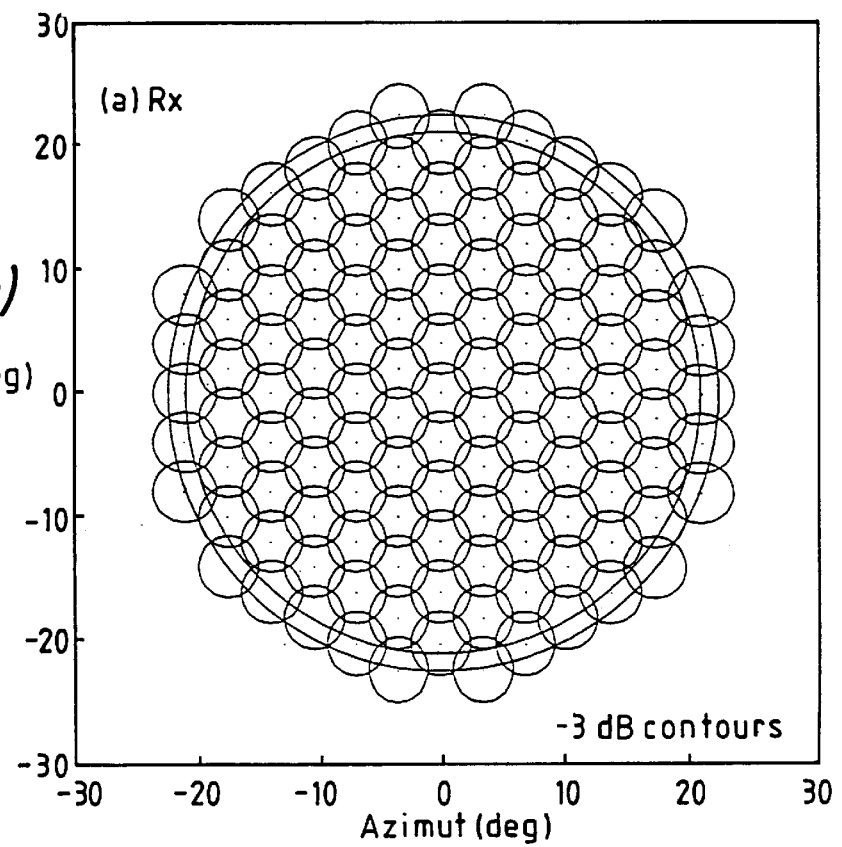
FIG. 6a is a diagram showing the radiation pattern of the receive antenna of the embodiment of FIGS. 2 to 5.
Figure 6B:
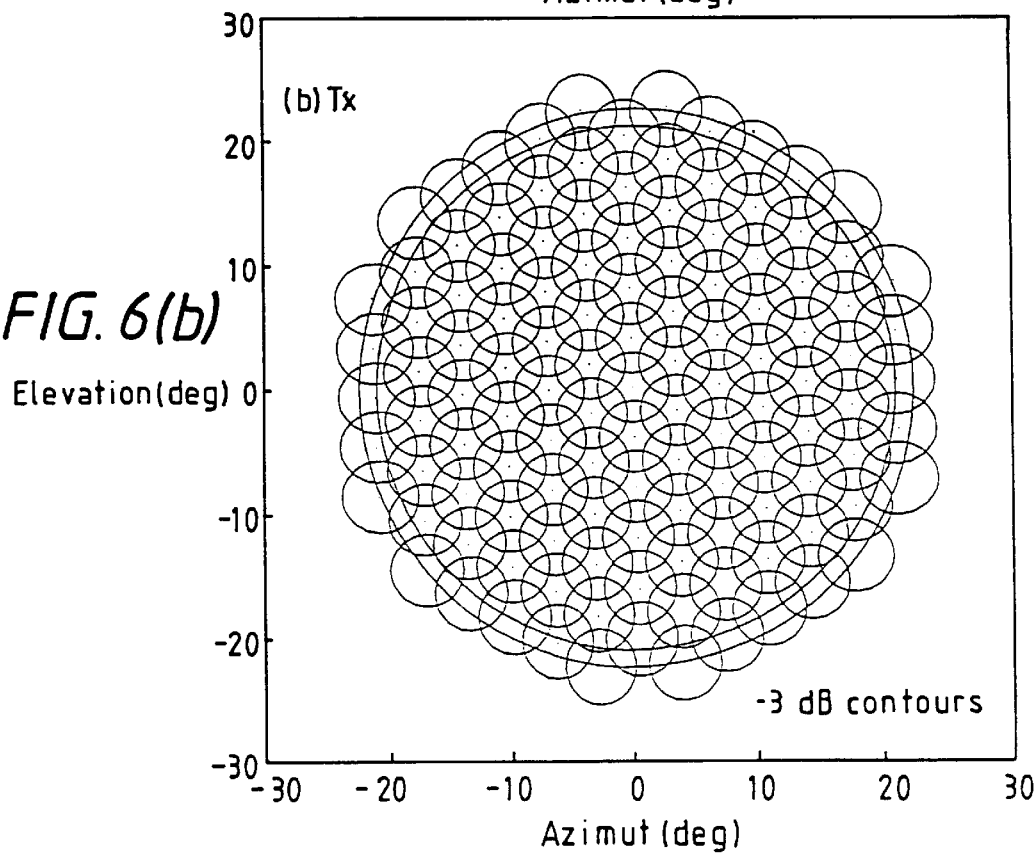
FIG. 6b is a corresponding plot of the radiation pattern of a transmit antenna according to this embodiment.

In the present embodiment, however, a hexagonal grid of beams is generated. Referring to FIG. 6, FIG. 6a illustrates the beam pattern of the receive antenna 1, and FIG. 6b illustrates that of the transmit antenna. It is apparent that the two comprise the same number of beams (121), and that the beams of FIG. 6b are congruent with the receive directions of FIG. 6a, but the latter are wider (and hence exhibit greater overlap, and reduced dropoff of strength between beams).

Figure 7A:
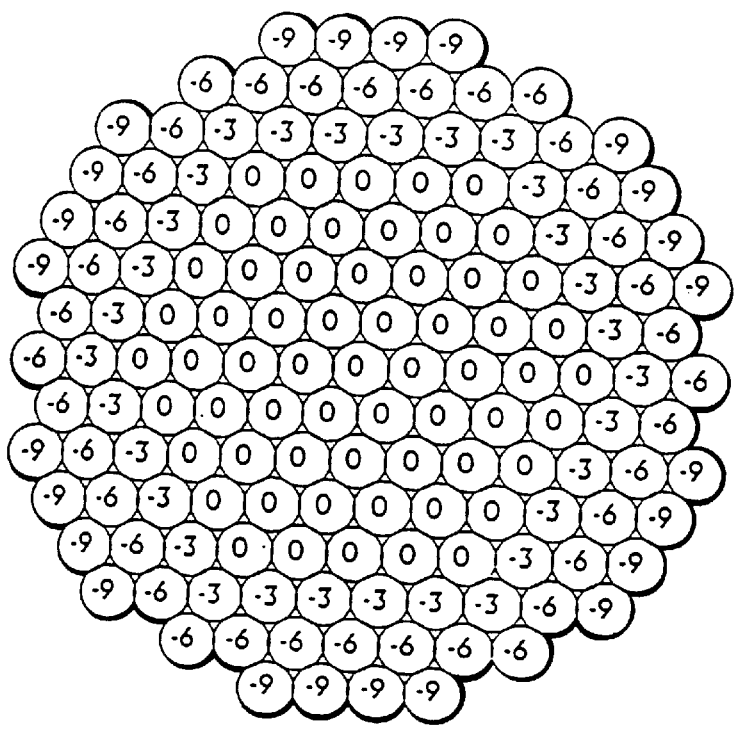
FIG. 7a illustrates the physical arrangement of array elements in the receive antenna, and indicates the relative gain of the amplifiers connected to each element.
Figure 7B:
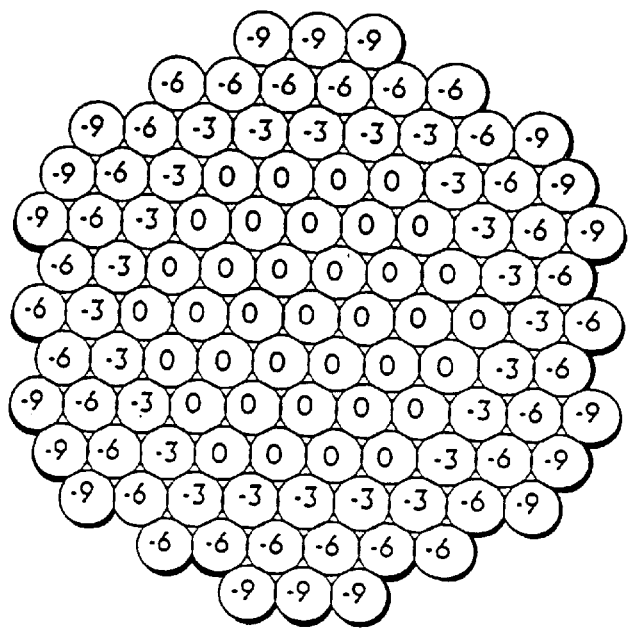
FIG. 7b illustrates the physical arrangement of array elements in the transmit antenna, and indicates the relative gain of the amplifiers connected to each element.

To provide these beam patterns, the antennas 1, 2 each comprise a hexagonal array of radiating elements 100a–100P, 200a–200M, for example microstrip dipoles (not shown) printed on a common substrate. Referring to FIG. 7, FIG. 7a illustrates the arrangement of the radiating elements 200 of the receive array antenna 2 and FIG. 7b illustrates the arrangement of the radiating elements 100 of the transmit array antenna 1.

The receive antenna 1 consists of P=151 elements 100, arranged as shown, spaced at spacings of s, where s/L=1.04, and L is the antenna wavelength (2 GHz). The total antenna diameter is 2.2 m. The transmit antenna 2 consists of M=109 elements 200, arranged as shown, spaced at spacings of s, where s/L=1.04, and L in this case is 2.2 GHz. The total antenna diameter is 1.7 m.

The 109 amplifiers 18a–18M of the transmit antenna in this embodiment do not all apply the same amplification. The gain applied by each amplifier, relative to that connected to the central element of the antenna, is indicated in the circles denoting each element position in FIG. 7b, from which it may be seen that the gain is tapered at the edges of the array, by providing three outermost rings of elements 200 the gains for which are −3, −6 and −9 dB down relative to all the inner elements.

Exactly the same is provided for the receive antenna of FIG. 7a, by providing that the amplifiers 117a–117P for the three outermost hexagonal rings of elements 100 have progressively decreasing gains (again, −3, −6, and −9 dB) relative to those for the inner elements.

The interconnection of the analogue beam formers 20, 120 and the antennas 1,2 will now be described with reference to FIGS. 5, 8 and 9. Referring to FIG. 5, the first ports X of the stack 30a of matrix devices 50 form a two dimensional array of ports, each of which will be referred to by coordinates (i,j), where 0<i,j<15. The index i indicates the number of the port along the side X of a matrix device of the first stack 30a, and the index j indicates the number of the port along the side X of the matrices of the second stack 30b to which that matrix device of the first stack is connected.

FIG. 8 indicates the connection of the N=121 modulated beams output from the array 16 of up-convertors to the beam former 20. If, as shown, the axes i=10,j=10 are aligned at 60 degrees and values of i,j are wrapped around, the hexagonal symmetry of connection becomes apparent. Exactly the same connections are provided between the beam former 120 and the array 116 of down-converters. To accommodate all 121 beams, a maximum of 13 values of i are required; thus, it is possible to provide only 13 matrix devices in the first stack 30a of the beam formers 20 and 120; the removed matrices are indicated by dashed lines in FIG. 8. Those ports which are unconnected are terminated, preferably by a matched load.

Figure 9A:
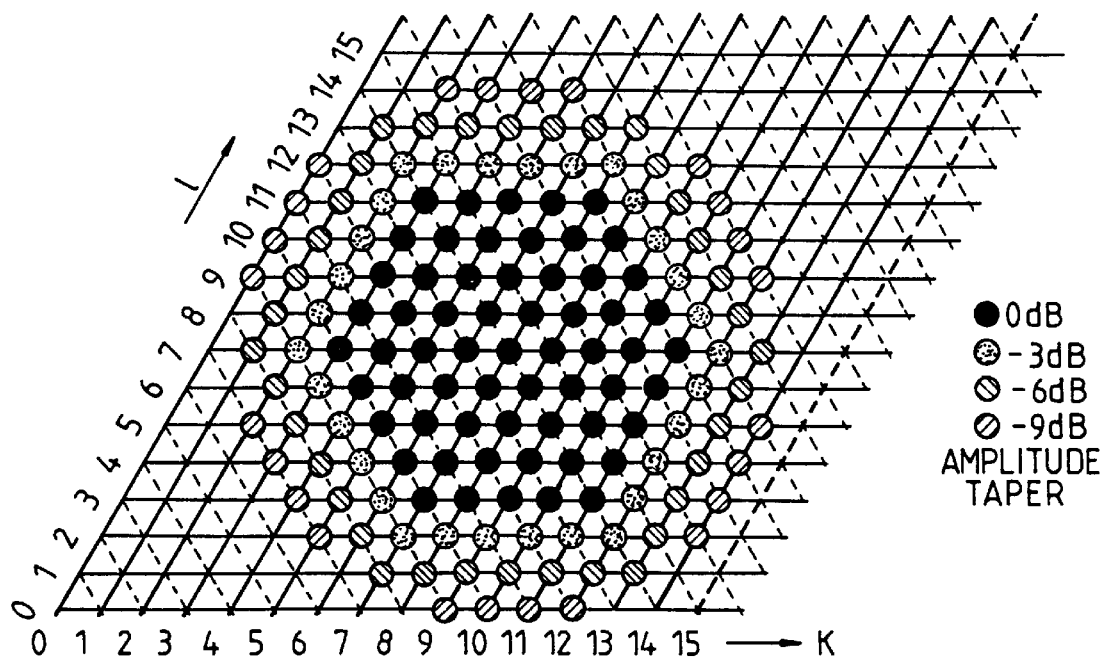
FIG. 9a illustrates the respective connections between elements of the receive antenna and the beam former of FIG. 5.

FIG. 9a indicates the connection of the P=151 elements 100a–100P of the receive array antenna 1 (via the filters 118 and amplifiers 117) to the second ports Y of the second stack 30b of matrix devices 50 in the analogue beam former 120. The arrangement of elements 100 depicted corresponds to that of FIG. 7a, so that the outer three rings of elements depicted are those which have tapered gains as discussed above.

Referring to FIG. 5, the second ports Y of the stack 30b of matrix devices 50 form a two dimensional array of ports, each of which will be referred to by coordinates (k,l), where 0<k,l<15. The index i indicates the number of the port along the side Y of a matrix device of the second stack 30b, and the index k indicates the number of the port along the side Y of the matrices of the first stack 30a to which that matrix device of the second stack is connected.

If the axes k=0,l=0 are drawn at 60 degrees, as in FIG. 9a, the hexagonal symmetry is apparent. To accommodate all 151 elements, a maximum of 15 values of k are required; thus, it is possible to provide only 15 matrix devices in the second stack 30b. Those ports which are unconnected are terminated by a matched load. Thus, the beam former 120 for the receive antenna requires 28 matrix devices 50.

Figure 9B:
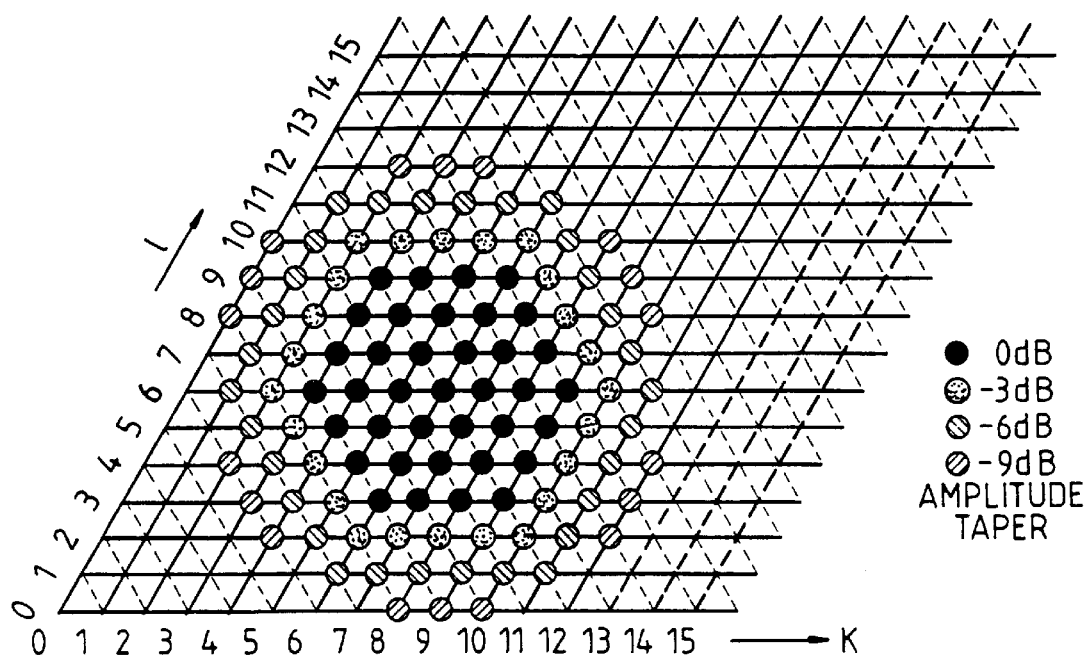
FIG. 9b illustrates the respective connections between elements of the transmit antenna and the beam former of FIG. 5.

FIG. 9b corresponds to FIG. 9a and FIG. 7b, and illustrates the connections (via the amplifiers 17 and filters 18) between the elements 200a–200M of the transmit antenna 2 and the beam former 20. Since only M=109 elements 200 are provided, the number of matrix devices required in the second stack is 13 and the total number of matrix devices 50 is 26. Unused ports are terminated by a matched load.

In operation, a beam signal input at a port of the analogue beam former 20 is split into 16 equal outputs at the output ports of a matrix device of the first stack 30a, three of which are terminated (since the second stack 30b only comprises 13 matrix devices). Each of the remaining thirteen signals input to respective matrices of the second stack 30b is split into 16 equal outputs at the output ports of each matrix, a total of 13*16=208 outputs, 101 of which are terminated. The remaining 109 output signals are. fed, via the amplifiers, to the array elements 200. Their phases are in a relationship to each other such that they combine to generate one of the beams of the hexagonal grid shown in FIG. 6b. The same is true for each other beam input to different ports of the first stack 30a.

The termination of a number of ports, due to the use of oversized matrix devices 50 having more inputs than are required by both the number of beams and the number of elements, alters the pattern of each of the beams. The reduced number of elements causes a widening of each beam, and the provision of the different amplifications at peripheral elements imposes a smoothing window on the antenna aperture which results in each beam being further widened, so that the reduction in power at the point between three adjacent beams is only −2 dB, as compared with −7.8 dB for a fully connected, square Butler matrix array antenna. Some losses are caused by the terminations and different amplifications, relative to such a square array (which is essentially lossless) but these fairly low.

The antennas each have generally symmetrical (roughly circular or hexagonal) apertures, and the use of an oversized Butler matrix device in which not all elements are connected enables the production of an undistorted hexagonal beam pattern. Naturally, if all the points shown in FIGS. 8, 9a or 9b were connected then the result would be a trapezoidal array which, whilst exhibiting hexagonal symmetry, would have a distorted beam pattern.

In operation, the receive antenna 1 and beam former 120 operate in essentially the reverse manner to that described above, so that a received signal in one of the grid of reception directions of FIG. 6a is fed to one of the first ports of the first stack 30a of the beam former 120. As a larger number of elements 100 are provided, and fewer ports are terminated, the beam patterns are sharper but the power dropoff between three adjacent reception directions is still only −3 dB, due in part to the use of oversized matrix devices 50 and in part to the amplitude taper of the amplifiers 117.

A further aspect of the invention will now be discussed with reference to FIGS. 10 and 11.

Figure 10:
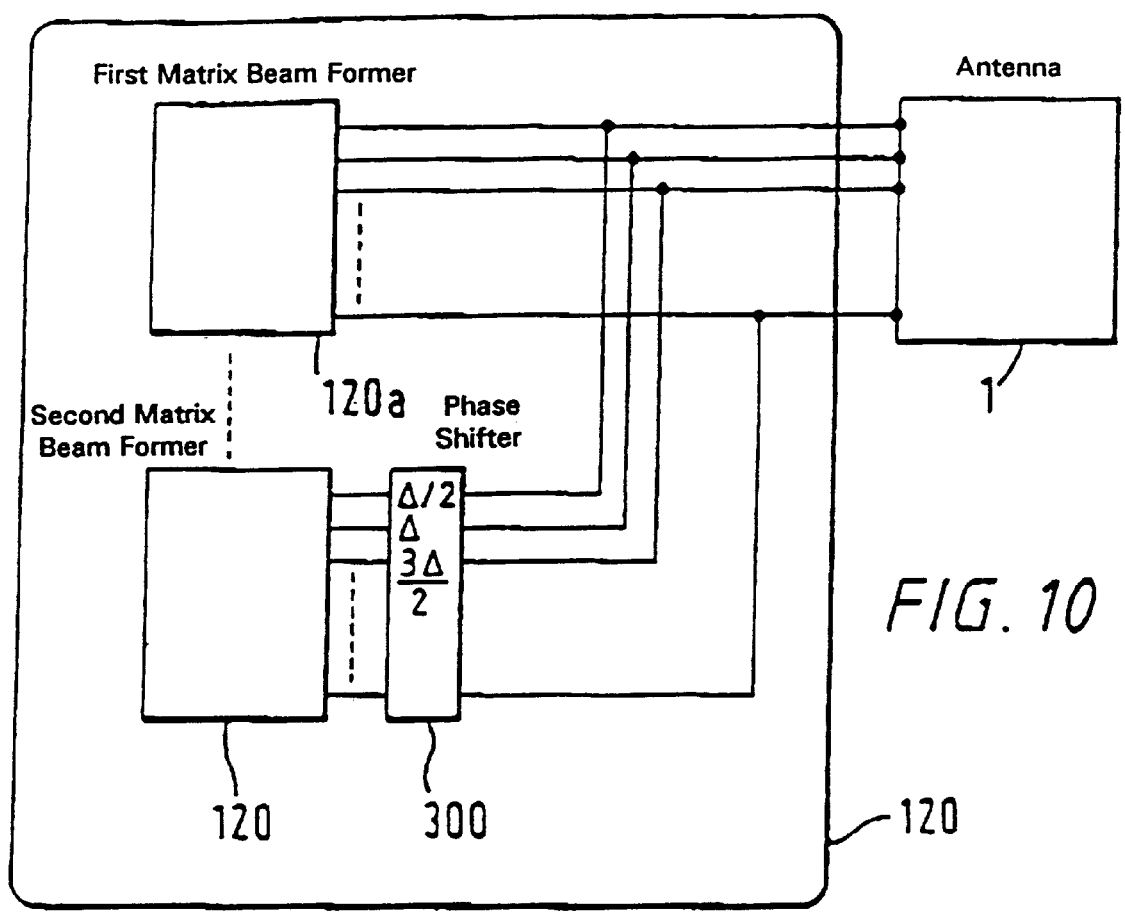
FIG. 10 illustrates a beam former and antenna arrangement according to a further embodiment of the invention.

Referring to FIG. 10, in this embodiment each element of an array antenna 1 (or 2) is connected to a corresponding output port of a first Butler matrix beam former 120a, and of a second beam former 120b. Each of the beam formers 120a, 120b has generally the structure shown in FIG. 5, although conveniently in this embodiment, where N-in, N-out matrix devices of the type shown in FIG. 4 are employed, each of the stacks 30a, 30b consists of N Butler matrices, and the antenna 1 comprises $N^2$ radiating elements 100 in a square array.

Each of the Butler matrix devices 120a, 120b therefore has $N^2$ beam ports. It will be apparent that if the device were used without further modification, the array of beams generated by the two Butler matrices would be coincident with each other. However, one array can be offset relative to the other by providing a phase shifting device 300 between one of the Butler matrix devices 120b and the antenna 1. To align the beams in one dimension, it is merely necessary that the phase shifting device 300 should provide a progressive phase shift increasing linearly from the elements on one side of the antenna 1 to those on the other side. If the array of beams is to be aligned in two dimensions, it is apparent that a phase shift across the antenna 1 in two dimensions (i.e. 'vertically' and 'horizontally') needs to be applied.

The phase shift device 300 may simply be provided by a microwave transmission line (for example a microstrip line) tapped at different lengths across the array.

Figure 11:
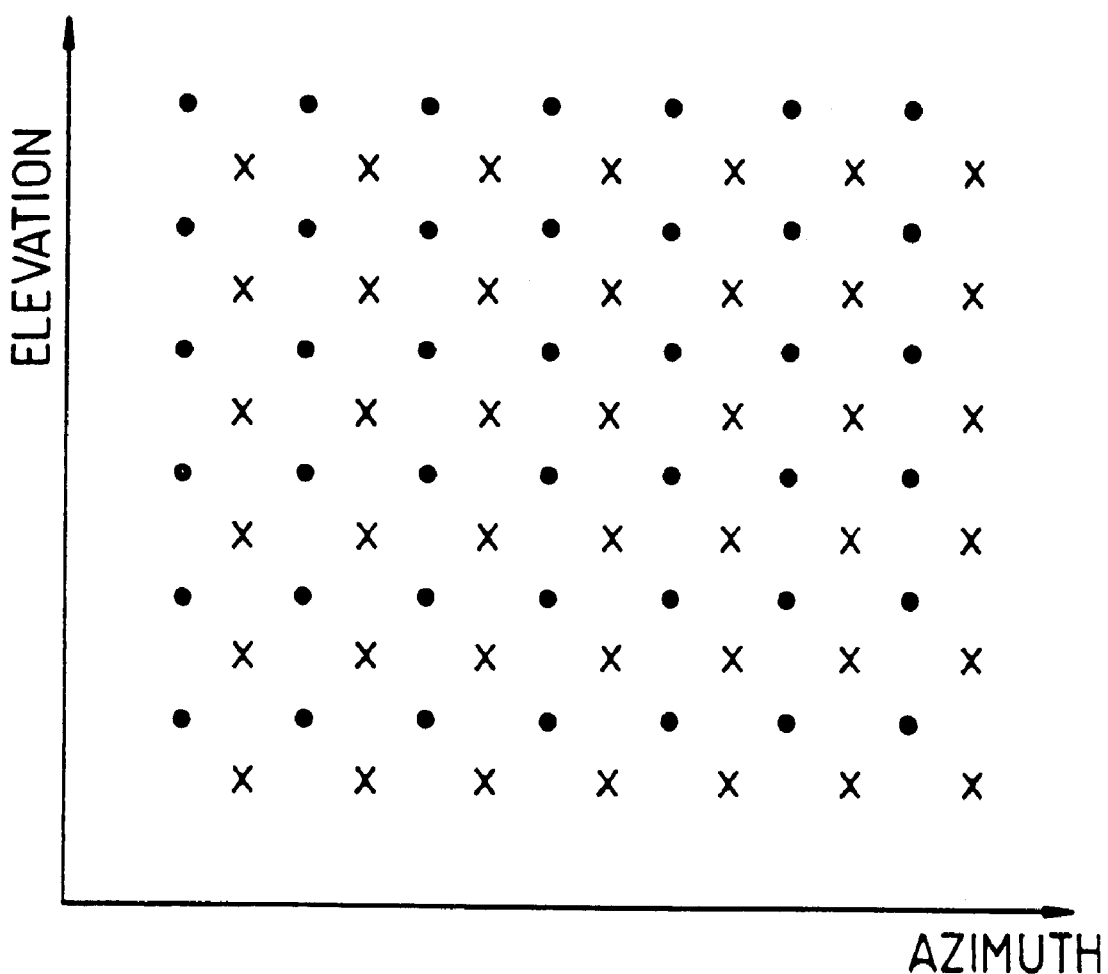
FIG. 11 illustrates schematically the radiation pattern obtainable with the embodiment of FIG. 10.

Referring to FIG. 11, in one preferred embodiment, the phase shifter 300 is such as to align one grid of beams by an angle of $N\Delta/2$, where N is an integer, in both elevation and azimuth, so that the peak beam positions due to the beams connected to the second matrix device 120b lie at the minima between four adjacent beams due to the first Butler matrix device 120a.

In FIG. 11, only the beam centres are shown; beam centres due to beams of the first matrix device 120a are shown as dots and those due to the second matrix device 120b are shown as crosses.

The array will be seen to be a square array, inclined at 45°, with a higher level of crossover.

Thus, in this embodiment, a single antenna can be used to generate a large number of beams, and square or non square beam arrays can be produced from a square array antenna, with improved beam coverage and reduced dropoff between beams. In the embodiment shown in FIG. 3, each of the analogue beam formers 20, 120 could be replaced by two or more Butler matrix devices 120a, 120b and one or more incremental phase shifters 300.

In general, several non-square (e.g. hexagonal) arrays could also be combined according to this embodiment. For example, a hexagonal grid can be produced using three Butler matrix devices arranged to generate three mutually offset hexagonal beam arrays.

This embodiment may be used for applications other than satellite communications; for example, other communication applications, or radar applications.

It will be apparent that the foregoing embodiments are by way of example only, many other embodiments or variations of the above embodiment being possible. The following are merely examples of such variations.

Although in the foregoing devices which are provided by 2×2 hybrids have been discussed, it would be possible to provide non binary matrices using three by three couplers or other structures, as taught, for example, in "Multiple beams from linear arrays", Shelton and Kelleher, IRE Transactions on Antennas and Propagation, Vol AP-9, pp. 155–161, March 1961.

Although, in the foregoing, stripline construction has been mentioned the invention may be realised using other technologies (e.g. MMIC). Likewise, radiating elements such as horns or patches could be used as well as dipoles.

Although frequency division multiplexing has been described above, it will be apparent that other systems (for example time division multiplexing or code division multiplexing) could be used. Although intermediate circular orbits have been discussed, it will be apparent that the invention is also applicable to low earth orbits (LEO) or other orbits. Although mobile telecommunications satellite communication has been discussed, it will be clear that the invention could be applied to fixed telecommunications via satellite; equally, aspects of the invention could be applied to communication fields other than satellite communications.

It will therefore be understood that the invention is not limited to the above examples, but extends to any other variations, substitutions or modifications which would be apparent to the skilled reader.

What is claimed is:

1. A satellite payload apparatus for generating or receiving a regularly angularly dispersed array of simultaneous radiation beams illuminating the earth, comprising an array of radiating elements defining an array antenna; and a beam former, the beam former comprising a network having a first side carrying a plurality of beam ports each for receiving a respective electrical signal corresponding to one of the beams, and a second side carrying a plurality of antenna ports each corresponding to one of the radiating elements such that some of the antenna ports are not connected to radiating elements, wherein there are more antenna ports than radiating elements, each beam port being connected to a plurality of antenna ports via a network of cascaded power divider and phase shifter components, the phase shifts of which are in integer multiples of a predetermined constant, so as to generate the array of beams; in which the array antenna has triangular or hexagonal symmetry and the array of beams has triangular or hexagonal symmetry.

2. Apparatus according to claim 1, in which a power drop off between adjacent beams is no more than 3 dB.

3. Apparatus according to claim 1, in which said antenna is a direct radiating antenna.

4. Apparatus according to claim 1, in which the antenna ports which are not connected to radiating elements are terminated by terminating loads.

5. Apparatus according to claim 1, in which each radiating element is connected via a feed path to an antenna port, the gain in the feed paths to radiating elements at the periphery of the antenna being lower than the gain in the feed paths of radiating elements inwards of the periphery, so as to apply an amplitude taper to the antenna aperture.

6. Apparatus according to claim 1, in which said power divider components each comprise 90° hybrids.

7. Apparatus according to claim 1, further comprising beam receiving means coupled to said first ports.

8. Apparatus according to claim 1, further comprising beam generating means coupled to said first ports.

9. Apparatus according to claim 1 comprising a first said antenna coupled, via a first said network, to beam generating means and a second said antenna coupled, via a second said network, to a beam receiving means.

10. Apparatus according to claim 9 in which said receiving means is arranged to receive in a reception frequency band, and said generating means is arranged to generate in a transmission frequency band different from said reception frequency band.

11. Apparatus according to claim 10, in which said first antenna is arranged to generate an array of transmission beams and said second antenna is arranged to generate an array of reception beams, each reception beam being aligned with a corresponding transmission beam.

12. A satellite payload apparatus for generating or receiving a regularly angularly dispersed array of simultaneous radiation beams illuminating the earth, comprising an array of radiating elements defining an array antenna; and a beam former, the beam former comprising a network having a first side carrying a plurality of beam ports each for receiving a respective electrical signal corresponding to one of the beams, and a second side carrying a plurality of antenna ports each corresponding to one of the radiating elements, each beam port being connected to a plurality of antenna ports via a network of cascaded power divider and phase shifter components, the phase shifts of which are in integer multiples of a predetermined constant, so as to generate the array of beams; in which the array antenna has triangular or hexagonal symmetry and the array of beams has triangular or hexagonal symmetry, in which the network comprises a first set of $N_1$-in, $N_1$-out Butler matrix devices, each having a first side and a second side, the first sides of the first set providing the beam ports; and a second set of $N_2$-in, $N_2$-out Butler matrix devices, each having a first side and a second side, the second sides of the second set providing the antenna ports, in which the ports of the first side of each Butler matrix device of the second set are connected to ports of the second sides of a plurality of different Butler matrix devices of the first set, so that each beam port is connected to every antenna port.

13. Apparatus according to claim 12, in which there are fewer than $N_1$ Butler matrix devices in the first set.

14. Apparatus according to claim 12, in which there are fewer than $N_2$ Butler matrix devices in the second set.

15. A beam forming network for generating at least one radiation beam on at least one of an angular array of beam directions from an array antenna, comprising a first set of passive power divider matrix devices each having $N_1$-inputs and $N_1$-outputs; and a second set of passive power divider matrix devices each having $N_2$-inputs and $N_2$-outputs; the total number of matrix devices being less than $(N_1+N_2)$; in which fewer than $N_1^2$ first ports of the devices of said first set are provided as beam ports, and fewer than $N_2^2$ second ports of the devices of said second set are provided as antenna ports; and in which each first port of a device of said second set is connected to a second port of a different device of said first set, such that each beam port is connected to all antenna ports.

16. A beam forming network according to claim 15, in which there are $M_1$ devices in the first set, where $M_1$ is less than $N_1$.

17. A beam forming network according to claim 16, in which there are fewer than $(M_1 \times N_1)$ beam ports.

18. A beam forming network according to claim 16, in which there are $M_2$ devices in said second set, where $M_2$ is less than $N_2$.

19. A beam forming network according to claim 16, in which there are fewer than $(M_2 \times N_2)$ antenna ports.

20. An antenna system, comprising:
    an array of radiating elements defining an array antenna; and
    a plurality of power divider networks each comprising a plurality of beam ports each being connected to each of a plurality of antenna ports, in which antenna ports of different networks are jointly connected to each antenna element, in which each beam port corresponds to a beam direction of the antenna, and in which each network corresponds to a respective array of a plurality of said beam directions, the antenna system further comprising a phase shifting device connected to at least one of the power divider networks such that the arrays of the beam directions are mutually angularly displaced.

21. An antenna system according to claim 20, in which differential phase shift means are provided for providing different phase shifts between the beam ports of different networks and each antenna element.

22. An antenna system according to claim 20 in which a first network corresponds to a respective first two dimensional array of beam directions and a second network corresponds to a second two dimensional array of beam directions occupying positions at the minimum at a minima between adjacent beams of the first array.

23. An antenna system according to claim 21 comprising three networks each corresponding to hexagonal arrays of beam directions, superposable to provide a further hexagonal array of beam directions.

* * * * *